Figures 1, 2, 3:
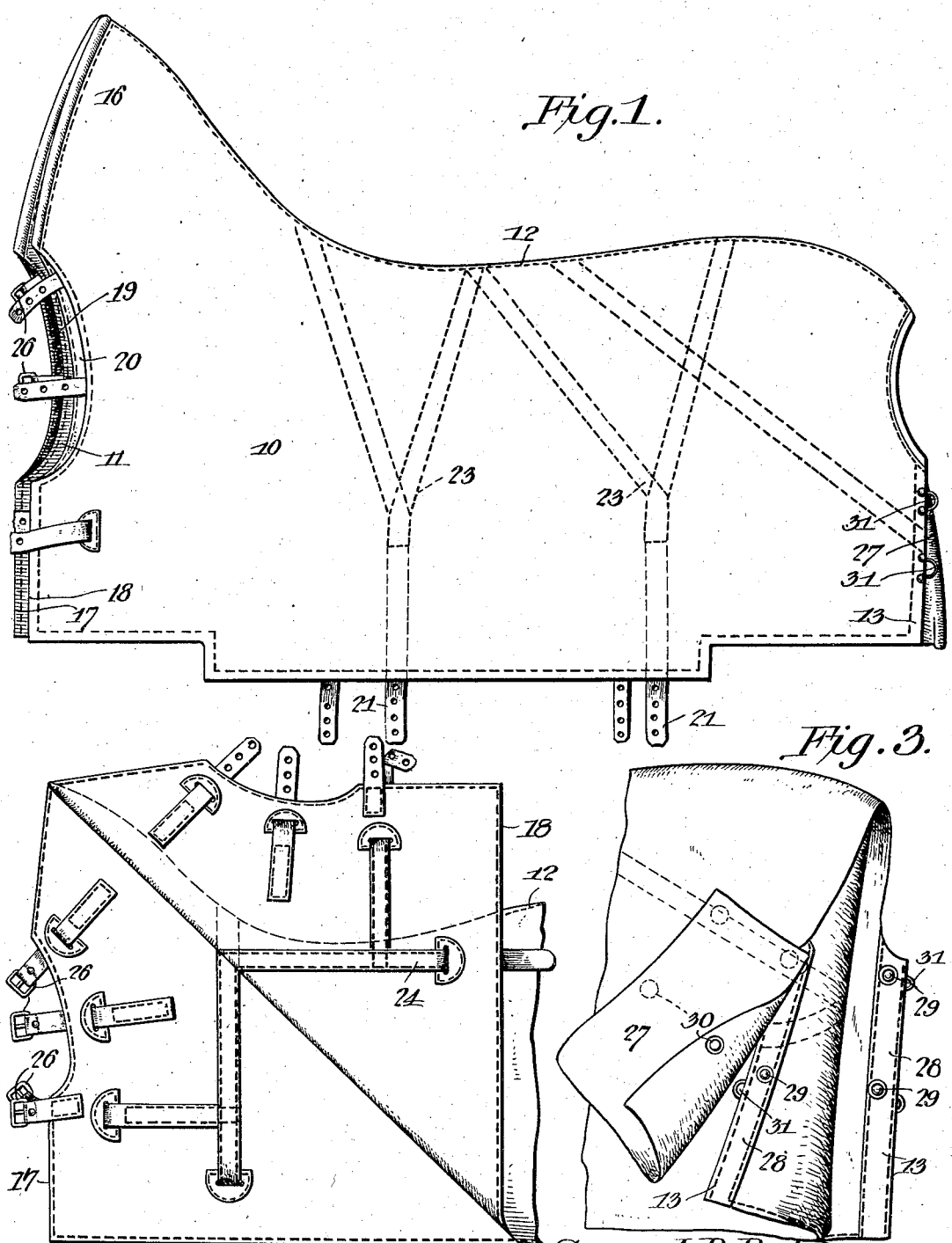

No. 785,021. PATENTED MAR. 14, 1905.
S. D. & E. M. REID.
ANIMAL BLANKET.
APPLICATION FILED MAR. 28, 1904.

2 SHEETS—SHEET 1.

Witnesses  
E. K. Stewart  
J. H. Jochum, Jr.

Samuel D. Reid and  
Ella M. Reid, Inventors.

by C. A. Snow & Co.  
Attorneys

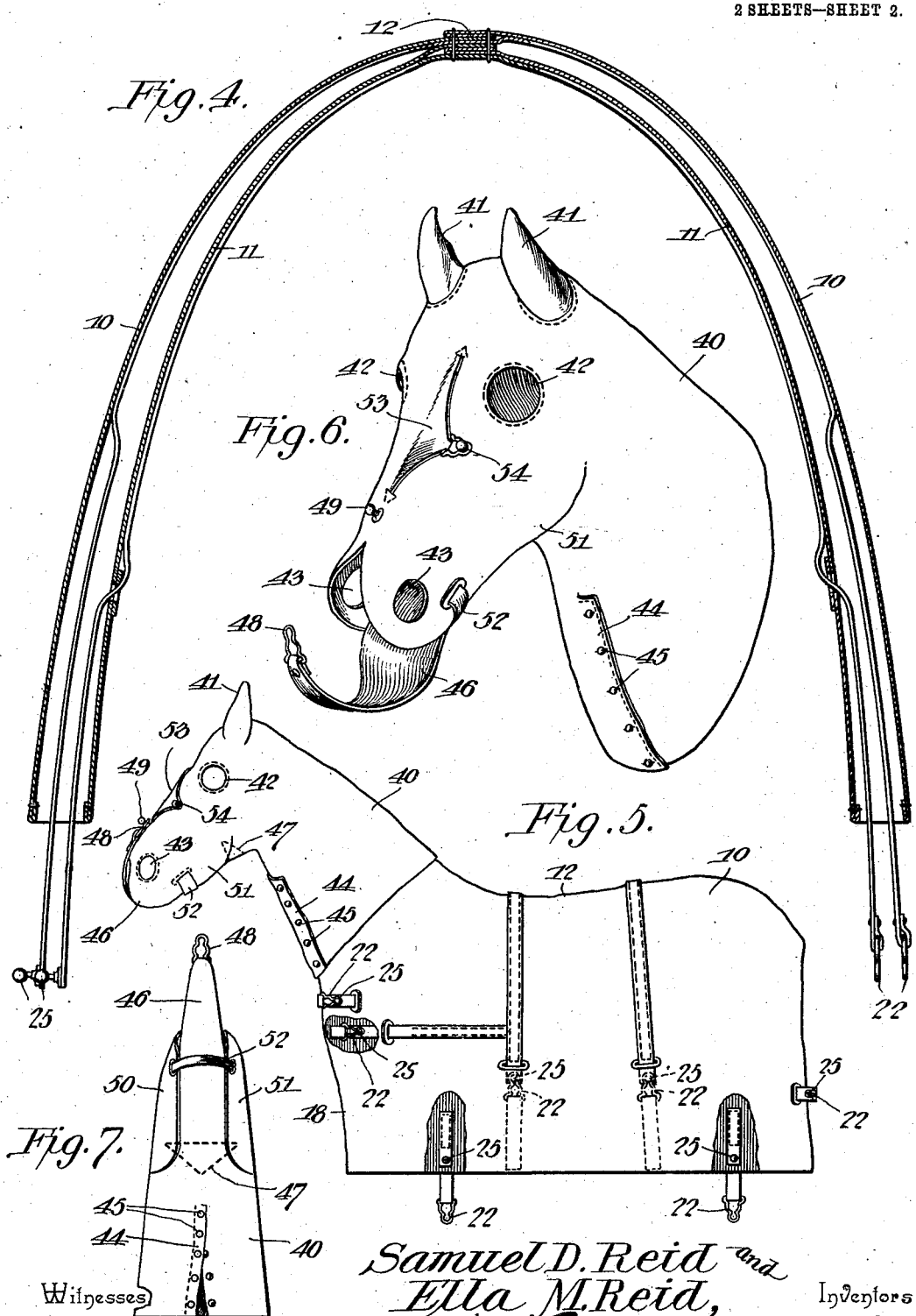

No. 785,021.                                                                Patented March 14, 1905.

UNITED STATES PATENT OFFICE.

SAMUEL D. REID AND ELLA M. REID, OF BURLINGTON, KANSAS.

ANIMAL-BLANKET.

SPECIFICATION forming part of Letters Patent No. 785,021, dated March 14, 1905.

Application filed March 28, 1904. Serial No. 200,398.

*To all whom it may concern:*

Be it known that we, SAMUEL D. REID and ELLA M. REID, citizens of the United States, residing at Burlington, in the county of Coffey and State of Kansas, have invented a new and useful Animal-Blanket, of which the following is a specification.

This invention relates to blankets for animals, more particularly for horses, and has for its object to improve the construction and means for fastening in place of such garments; and the invention consists in certain novel features of construction, as hereinafter shown and described, and specified in the claims.

In the drawings illustrative of the invention, in which corresponding parts are denoted by like designating characters, Figure 1 is a side view of the device. Fig. 2 is a detail view of the blanket detached, with the front end turned backward to illustrate the arrangement of the fastening-straps. Fig. 3 is a perspective view of the rear portion with the rear closure member partially disconnected. Fig. 4 is a transverse section with the parts distended. Fig. 5 is a side elevation showing some modifications in the arrangement of the parts. Fig. 6 is a perspective view showing the head-covering. Fig. 7 is a bottom plan view, on a reduced scale, of the head-covering portion.

The improved device consists in part of two blanket members 10 11, conforming to the body of the animal and superposed, as shown, and connected along the back, preferably by sewing, as indicated at 12, and likewise connected at the rear end 13. At the front the members 10 11 are extended, as at 16, to inclose a portion of the neck and will be connected together at this portion and also connected at the lower portions 17 18, leaving the central portions of the sides open at 19 20. Attached to the outer member 10, either inside, as in Figs. 1 and 2, or outside, as in Fig. 5, are straps 21, with their ends hanging free and terminating in fastening means, preferably, as shown in Figs. 4 and 5, formed of an eye 22 on one strap and a stud 25, having large heads and comparatively small shanks, on the other strap, as in Figs. 4, 5, 6, and 7. The eyes 22 are each formed with two loops of unequal size with a contracted portion between them. The larger portion of the loop will receive the large head of the stud 25, while the contracted portion between the loops will permit the reduced shank of the stud to pass only when force is applied, so that when the enlarged head of the stud is inserted through the larger loop and the shank forced through the larger loop and the shank forced through the contracted portion between them and thence into the smaller loop, which is smaller than the head 25 of the stud, the fastening will be complete and will not become accidentally disconnected. When the fastening is to be released, pressure of the thumb applied with a backward movement will release it by forcing the shank through the contracted portion between the loops. By this simple means it will be obvious the two parts of the straps may be quickly connected and disconnected when required; but while this form of fastening is the preferable one we do not wish to be limited thereto, as the substitution of any other suitable fastening, such as ordinary buckles 26, (shown in Figs. 1 and 2,) would not be an avoidance of the principle of the invention. The straps will be arranged, preferably, to extend uniformly over the member 10 and converging, as at 23, in Y shape, whereby the strains are uniformly distributed and borne entirely by the straps and not by the blanket material. Similar straps 24 will be connected to the inner blanket member 11 and likewise terminating in fastening-snaps, buckles, or the like, so that each blanket member has its own independent system of fastening-straps. The straps extending over the back and down the sides serve the same purpose as surcingles to firmly secure the blanket members to the animal.

The front ends of the blanket members may be provided with spaced buckles, as shown in Figs. 1 and 2, or with hooks and eyes, as shown in Figs. 4 and 5, or with snaps, as shown in Fig. 3, which will permit the said members to be securely fastened around the throat and across the chest of the animal, and thus afford ample protection.

At the rear end, as above noted, the blanket members are united and will be connected at the lower depending portions by a closure member or apron 27, of waterproof material, on the interior to serve as a protection or shield against the entrance of cold air, rain, or snow. The united edges of the rear sides of the blanket members are reinforced by binding-strips 28 having spaced fastening members 29, and the member 27 is likewise provided with correspondingly-disposed fastening means 30, adapted to be engaged by the members 29, and thus connect the member 27 in position. The apron 27 is thus removable when not required or when it requires cleaning. The united members 10 11 will be also provided with additional fastening means 31, so that the blanket members may be fastened at the rear independently of the closure 27 or in addition thereto, as required. Above the member 27 an aperture remains for the tail of the animal, as shown.

In Fig. 5 a modification is shown in the arrangement of the fastening-strap members, wherein they are shown arranged exteriorly of the outer member 10, which may be the preferred arrangement under some circumstances and with some kinds of animals; but this would not be a departure from the principle of the invention, as the results and mode of operation would be substantially the same.

In Figs. 5, 6, and 7 is represented the head-covering, comprising a hood 40 of any suitable material, but preferably of knitted fabric, and formed to fit the animal's head and provided with pockets 41 for the ears, apertures 42 43, respectively, for the eyes and nostrils, and with a comparatively large opening for the mouth and extending beneath the chin. The neck portion of the hood 40 will be formed with a longitudinal opening beneath the throat covered by a flap 44, buttoned or otherwise fastened, as at 45, to provide for the ready placing of the device over the animal's head. The opening for the mouth is provided with a long flap 46, connected beneath the chin, as shown in Fig. 7, as by stitches 47, to insure proper strength and adapted to be fastened above the nose by fastening means 48 49, similar to the fastening means 22 25. The hood member 40 is provided beneath the chin with spaced flaps 50 51, which partially cover the flap 46 and are united by an elastic strap 52, as shown. Longitudinally disposed in the front of the head-covering is an aperture covered by a flap 53 and provided with a fastening means 54 to enable the hood portion to be drawn more closely to improve the "fit" of the hood, as well as to provide a means for ventilation when required. By this simple means a very complete and easily attached and detached head-covering is produced which will effectually protect the head.

The blanket material may be of any suitable kind—such as woolen fabric, canvas, or other suitable material or combination of material—or the outer member may be of one material and the inner member of another material, as required, and we do not, therefore, desire to be limited to any specific material or combinations of material. The strap members and fastening means may also be of any desired form or material or combinations of material, and the parts may be modified and changed in minor particulars, without departing from the principle of the invention or sacrificing any of its advantages.

By this simple arrangement a warm durable blanket or covering is produced which cannot be displaced by any movements or contortions in which the animal may indulge, as the outer member serves as a protection to prevent the displacement of the inner member when the animal lies down or rolls.

The parts are so reinforced and supported that the strains are uniformly distributed and the relatively fragile blanket material protected and the tendency to fracture eliminated.

Having thus described the invention, what we claim is—

1. A blanket for animals having fastening means combined therewith, a head-covering detachably connected with the blanket and provided with apertures for the eyes and nostrils, and with an aperture for the mouth, and a closure for the mouth-aperture.

2. A blanket for animals having fastening means combined therewith, a head-covering detachably connected with the blanket and provided with apertures for the eyes and nostrils, and with an aperture for the mouth, a flap connected at one end with the head-covering beneath the chin, and fastening means for connecting the free end of the flap to the head-covering.

3. A blanket for animals having fastening means combined therewith at front and rear and belly portions, a head-covering detachably connected with the blanket and provided with apertures for the eyes and nostrils, and with an aperture for the mouth, a flap connected at one end to the head-covering beneath the chin, fastening means for connecting the free end of the flap to the head-covering, side flaps connected to the covering and extending over the said flap, and a yieldable strap disposed exteriorly of the first-named flap to hold the side flaps in position.

4. A blanket for animals having fastening means combined therewith, a head-covering detachably connected to the blanket and provided with ear-pockets, with apertures for the eyes and nostrils, and with an aperture for the mouth, and a closure for the mouth-aperture.

5. A blanket for animals conforming substantially to the body of the animal and having fastening means combined therewith, a head-covering detachably connected to the blanket and provided with ear-pockets and with apertures for the eyes and nostrils, with an aperture for the mouth and with a ventilating-aperture disposed intermediate of the eye-apertures, and a pair of flaps, one for closing the mouth-aperture and the other for closing the ventilating-aperture.

In testimony that we claim the foregoing as our own we have hereto affixed our signatures in the presence of two witnesses.

SAMUEL D. REID.
ELLA M. REID.

Witnesses:
C. O. BROWN,
A. L. HITCHENS.